(12) United States Patent
Taverniers et al.

(10) Patent No.: US 12,318,840 B2
(45) Date of Patent: Jun. 3, 2025

(54) SURROGATE MODELING OF MOLTEN DROPLET COALESCENCE IN ADDITIVE MANUFACTURING

(71) Applicant: Palo Alto Research Center Incorporated, Palo Alto, CA (US)

(72) Inventors: Søren Taverniers, Palo Alto, CA (US); Morad Behandish, San Mateo, CA (US); Svyatoslav Korneev, San Jose, CA (US)

(73) Assignee: Xerox Corporation, Norwalk, CT (US)

( * ) Notice: Subject to any disclaimer, the term of this patent is extended or adjusted under 35 U.S.C. 154(b) by 364 days.

(21) Appl. No.: 17/864,082

(22) Filed: Jul. 13, 2022

(65) Prior Publication Data
US 2024/0017325 A1 Jan. 18, 2024

(51) Int. Cl.
*B22F 10/85* (2021.01)
*B22F 10/22* (2021.01)
*B33Y 50/02* (2015.01)
*G06N 3/08* (2023.01)

(52) U.S. Cl.
CPC .............. *B22F 10/85* (2021.01); *B22F 10/22* (2021.01); *B33Y 50/02* (2014.12); *G06N 3/08* (2013.01)

(58) Field of Classification Search
CPC .......... B22F 10/85; B22F 10/22; B33Y 50/02; G06N 3/08
See application file for complete search history.

(56) References Cited

U.S. PATENT DOCUMENTS

| | | | |
|---|---|---|---|
| 2021/0291261 A1 | 9/2021 | Korneev et al. | |
| 2022/0161329 A1* | 5/2022 | Tsai | B22F 10/80 |
| 2022/0305559 A1* | 9/2022 | Hart | B22F 12/90 |

(Continued)

OTHER PUBLICATIONS

Taverniers et al., "Accelerating Part-Scale Simulation in Liquid Metal Jet Additive Manufacturing via Operator Learning", Association for the Advancement of Artificial Intelligence, 2022, 5 pages.

(Continued)

*Primary Examiner* — Scott T Baderman
*Assistant Examiner* — Seung Woon Jung
(74) *Attorney, Agent, or Firm* — Womble Bond Dickinson (US) LLP (57) ABSTRACT

Techniques for modeling a droplet-based additive manufacturing process are disclosed. An example method includes obtaining training data, setting one or more hyperparameter values in a data-driven surrogate model architecture, and training, by a processing device, the surrogate model architecture on the training data to generate a trained surrogate model. The trained surrogate model is to be used in lieu of a physics-based model to make predictions about the results of an additive manufacturing process. The training data includes pairs of input data and output data, wherein the input data describes an initial state of a substrate and a molten droplet inside a moving subdomain prior to the molten droplet impacting the substrate and the output data describes a final state of the substrate inside that moving subdomain after the molten droplet has impacted the substrate and coalesced with previously deposited droplets making up the initial state of the substrate.

16 Claims, 5 Drawing Sheets

(56) References Cited

U.S. PATENT DOCUMENTS

2022/0374565 A1* 11/2022 Chen .................. G06N 3/08
2023/0410412 A1* 12/2023 Roychowdhury ....... G06N 3/09

OTHER PUBLICATIONS

Li et al., "Fourier Neural Operator for Parametric Partial Differential Equations", Published as a conference pager at ICLR, 2021, 16 pages.

Bikas et al., "Additive manufacturing methods and modelling approaches: a critical review", The International Journal of Advanced Manufacturing Technology, 2016, 17 pages.

Jasak et al., "OpenFOAM: A C++ Library for Complex Physics Simulations", International Workshop on Coupled Methods in Numerical Dynamics, 2007, 20 pages.

Korneev et al., "Fabricated Shape Estimation for Additive Manufacturing Processes with Uncertainty", Computer-Aided Design, May 2020, 13 pages.

Raissi et al., "Physics-informed neural networks: A deep learning framework for solving forward and inverse problems Involving nonlinear partial differential equations", Journal of Computational Physics, vol. 378, Feb. 1, 2019, 21 pages.

Li et al., "Neural Operator: Graph Kernel Network for Partial Differential Equations", arXiv:2003.03485, Mar. 7, 2020, 21 pages.

Lu et al., "Learning nonlinear operators via DeepONet based on the universal approximation theorem of operators", Nature Machine Intelligence 218-229, Mar. 2021, 16 pages.

Sukhotskiy et al., "Magnetohydrodynamic Drop-on Demand Liquid Metal 3D Printing", Proceedings of the 28th Annual International Solid Freeform Fabrication Symposium, 2017, 6 pages.

Wang et al., "Learning the Solution Operator of Parametric Partial Differential Equations with Physics-Informed DeepOnets", arXiv:2103.10974, Mar. 19, 2021, 33 pages.

Li et al., GitHub repository for the Fourier Neural Operator PyTorch code, 2021.

Raissi, GitHub repository for the PINN TensorFlow code.

* cited by examiner

SURROGATE MODELING OF MOLTEN DROPLET COALESCENCE IN ADDITIVE MANUFACTURING

TECHNICAL FIELD

Implementations of the present disclosure relate to techniques for simulating the output of a 3D printer, and more specifically data-driven surrogate models including operator learning approaches that replace high-fidelity physics-based solvers traditionally used for such simulations with trained neural networks.

BACKGROUND

Additive manufacturing (often known as three-dimensional (3D) printing) enables production of structures that optimize strength to weight ratios. For example, hollow structures that are expensive or difficult to achieve in machining processes (i.e., removal of materials by cutting) may be created layer by layer in additive manufacturing. Many forms of additive manufacturing make use of transforming matter from one state to another, such as from liquid to solid, by chemical reactions or by heat (e.g., melting materials at specific locations and solidifying when cooled).

Depending on the type of 3D printing technology, the output of a 3D printing process may be highly dependent on a variety of factors, such as the properties of the build material (viscosity, density, temperature, etc.), the physical characteristics of the 3D printer, and others. Many of these factors may be controlled through various settings of the 3D printer. However, it may take several iterations of the 3D printing process to obtain a configuration that provides the desired results. Accordingly, it may be useful in some cases to be able to simulate the output of the 3D printer before the actual 3D object is printed. If several print iterations can be performed in a digital simulation, the user can more quickly determine suitable 3D printer settings for a particular print job, thereby saving time and material that would otherwise be wasted. The ability to simulate the results of a 3D print job depends on having a model that accurately describes the outcome of the 3D printing process.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments. Like numerals indicate like elements.

DETAILED DESCRIPTION

Aspects of the present disclosure provide various data-driven techniques for generating a surrogate model that can be used to simulate the output of a 3D printing process. The techniques disclosed herein are applicable to additive manufacturing (AM) processes that use jetting of liquids such as polymers and molten metals. For concreteness, the present disclosure will focus on liquid metal jetting (LMJ) from here on, noting that our description applies to other possible build materials as well, as long as they can be jetted in liquid form. In LMJ, a molten metal droplet can be ejected from a printhead nozzle and deposited onto a substrate. In such techniques, a single molten droplet deposited onto a (possibly partially) solidified substrate of the same material serves as the basic building block for fabrication by precise, droplet-wise deposition.

A moving subdomain approach as described in U.S. Patent Application Publication 2021/0291261 by Korneev et al. can be used to simulate the build process in LMJ. In this technique, the droplet deposition process in LMJ is simulated one droplet at a time by focusing on a spatial region of interest containing the molten droplet ejected from the nozzle and a portion of the substrate onto which it is to be deposited, which contains already (possibly partially) solidified droplets that were deposited previously. The goal then becomes to simulate the end state of the deposition process in the moving subdomain from the initial state which has a molten droplet suspended above the substrate.

Traditionally, high-fidelity (HF) physics-based models have been used for this purpose. Starting from the initial state, they compute the final state of the deposition by numerically integrating in time the coupled (partial) differential equations governing the multi-phase flow physics of the droplet deposition process, and using the build material's physical properties and applicable constitutive laws. This involves taking into account, for example, the ejected droplet's temperature and ejection speed, the temperature of the substrate (i.e., the 3D object being printed), the build material's viscosity, and many other factors.

While they are able to calculate the final state in the moving subdomain very accurately, HF models consume a large amount of processing resources and take a long time to compute as they need to satisfy certain numerical constraints associated with the numerical time integration process. For example, depending on the mesh resolution, a physics-based solver can take 20 minutes to 48 hours to simulate a single droplet, while printing a typical mechanical part can require millions of droplets ejected at 400-1000 Hz. Hence, current multi-physics solvers may not be suitable for real-time prediction of as-manufactured shapes during the printing process.

To resolve this issue, in accordance with embodiments of the present techniques, a data-driven surrogate model such as a neural network (NN) may be used in lieu of the HF physics-based solver to predict the final state of the droplet deposition process in the moving subdomain from the initial state in that subdomain. Rather than relying on numerical time integration, the surrogate model learns the initial-to-final mapping by training it on data generated either by an HF model or measured during LMJ AM experiments (i.e., generated previously by an actual 3D printer). Once the mapping is learned, the NN can predict (infer) the final state directly from the initial state, which can be orders of magnitude faster than performing numerical time integration with an HF model. This may make real-time part-scale simulation for 3D printing feasible, enabling rapid estimation of as-manufactured part shapes and corresponding machine-specific uncertainty.

Training a data-driven surrogate such that it can accurately predict the final state in the moving subdomain from the initial state is highly nontrivial. For example, accurate predictions may require training on a large data set, thereby offsetting some of the gains of the NN's fast inference capabilities. In order to overcome this, approaches such as physics-informed neural networks (PINNs) rely (mostly) on the initial and boundary data of the quantities of interest to be predicted, and introduce a physics-based residual in their loss function to satisfy applicable physical laws (e.g., conservation laws), thereby reducing or eliminating the need for training on labeled data. However, in the context of LMJ, a PINN would need to be retrained for every droplet deposition due to the changes in the initial conditions from one moving subdomain to the next.

To avoid retraining the surrogate from one droplet deposition to the next in LMJ, embodiments of the present techniques use data-driven surrogates based on operator learning (OL), such as neural operators and deep operator networks. These models approximate the solution operator of the governing PDE(s), rather than a particular instance of the solution for a given set of initial/boundary conditions and PDE parameters. This enables OL-based surrogates to predict the final state in the moving subdomain from a new initial state without having to be retrained, making it possible to train the surrogate once on a data set prior to the simulation of the 3D printing process, and then use the trained model for the initial-to-final mappings in all droplet-wise depositions.

The successful implementation of an OL-based approach involves several factors. The first caveat is controlling the size of the NN. It is possible to use a fully-connected feed-forward NN with a loss function that includes mass conservation constraints and use of an encoder/decoded architecture to limit the dimensions of the domain inside the network and thereby reduce the amount of required graphics processing unit (GPU) memory. However, despite these optimizations, the quadratic scaling of the number of network weights with the number of degrees of freedom (e.g., spatial grid size for 3D part shape prediction) may cause failure of the NN after only a few sequentially deposited droplets. In embodiments of the present techniques, a Fourier Neural Operator (FNO) is used which, rather than approximating the PDE solution operator directly, learns a kernel integral operator related to the PDE's Green function (or a generalization thereof for nonlinear PDEs). Furthermore, the FNO approach restricts the kernel integral operator to a convolution, and uses the Fast Fourier Transform (FFT) to learn this operator directly in Fourier space. The combination of parameter sharing among neurons in convolutional network layers (thereby reducing the NN's size) and the highly efficient implementation of FFT on GPUs makes it feasible for an FNO-based surrogate to predict the initial-to-final mappings for an entire 3D printed part, and do this sufficiently fast (in particular, orders of magnitude faster than CPU-based implementations of HF solvers) to enable real-time part-shape prediction.

Another caveat in OL-based approaches for LMJ, specifically for shape estimation, is the surrogate's ability to handle a plethora of different geometric features like edges, overhangs, etc. throughout the 3D object simulation process. This can be improved by increasing the diversity of the training set, along with the use of different surrogate models for different sections of the 3D printed object. Note that these models can still be trained prior to the 3D printing simulation process, and each model can still handle a variety of initial conditions. This approach involving multiple OL-based surrogate models may also limit the amount of training data needed for each model, such that the overall training process may not be more expensive compared to training a single OL-based surrogate on a larger training data set.

Aside from the question of picking a single versus multiple FNO or other OL-based surrogate models for predicting a full 3D object, selecting appropriate values for each model's hyperparameters is a complex matter that depends on a variety of factors like the amount and diversity of available training data, the fields picked for the field-to-field regression (i.e., the initial-to-final mapping) which depends on the application (e.g., shape estimation versus modeling of residual stresses), etc. In the case of FNO, this means determining the width of each Fourier layer (i.e., the number of channels) and the number of retained Fourier modes.

Other issues that determine the performance of the OL-based model in an LMJ simulation are computational overhead from other operations such as moving models and data into and out of the GPU(s), thresholding phase fractions in a mass-conserving way, determining the placement of a new molten droplet above the substrate and hence the vertical boundaries of the moving subdomain, dealing with hanging voxels, among others.

Embodiments of the present techniques may be described further below in relation to the operator learning (OL) technique known as a Fourier Neural Operator (FNO). However, it will be appreciated that the techniques disclosed herein may also be implemented with other OL approaches such as deep operator networks (DeepONets). Furthermore, while the classical PINN architecture may not be a suitable option as discussed above, physics-informed variants of FNO and DeepONet which, like PINNs, incorporate physical constraints into their loss function may be used and may in fact reduce the amount of labeled data required to train the surrogate model.

Figure 1:
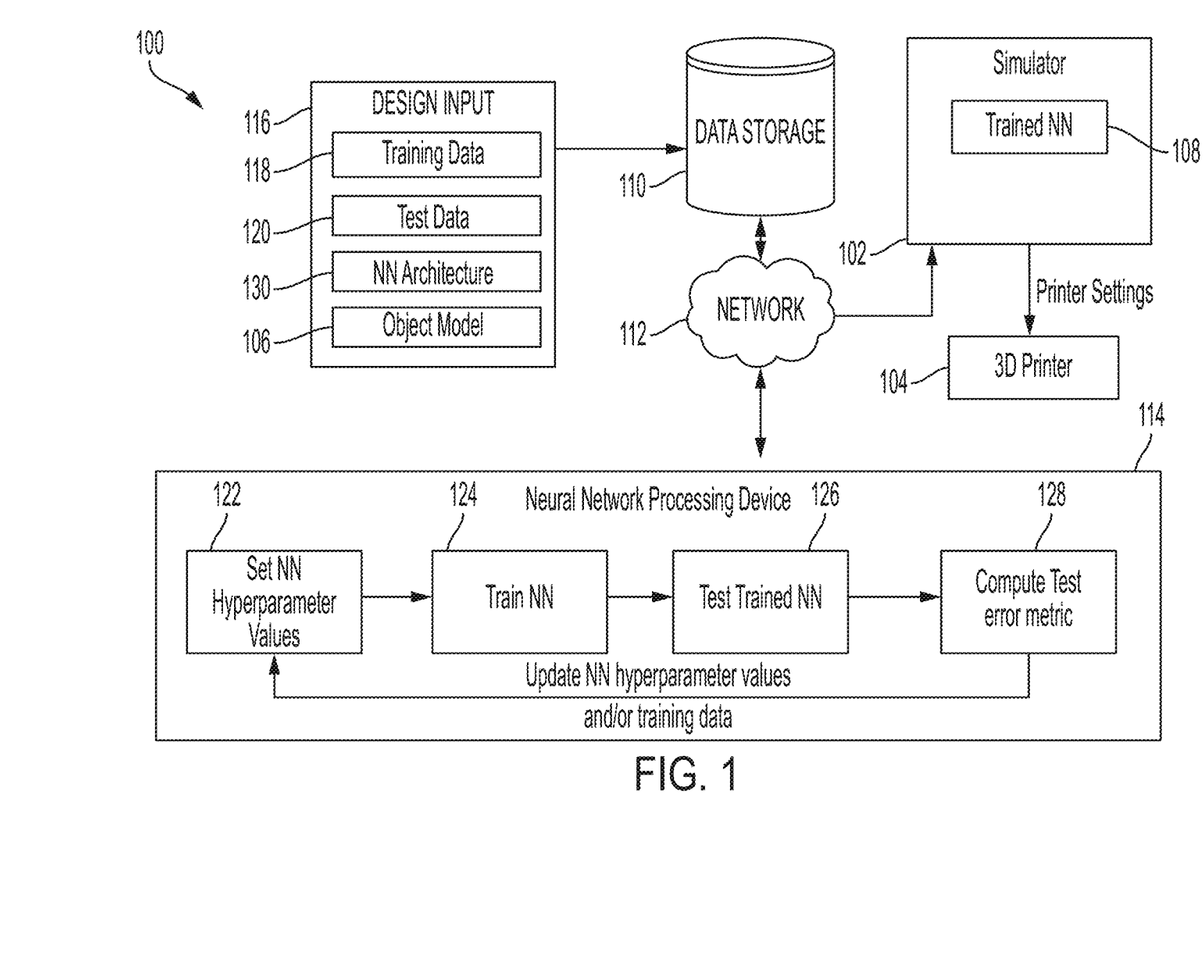
FIG. 1 illustrates a block diagram of a 3D printing system, in accordance with certain aspects of the present disclosure.

FIG. 1 illustrates a block diagram of a 3D printing system, in accordance with certain aspects of the present disclosure. The system 100 can include a simulator 102 that is configured to simulate the output of an actual 3D printer 104. The simulator 102 can receive an object model 106 describing a 3D object to be printed, and use a trained neural network 108 to generate a (portion of a) digital representation (digital twin) of the 3D object that would be printed by the 3D printer 104. The digital representation may include the shape of the object and other characteristics such as temperature. The simulator 102 may be connected to a data storage device 110 through a network 112. The data storage device 110 may store various types of data such as object models 106, training data 118, and test data 120, which can be accessed by the simulator 102. The 3D printer 104 may be an LMJ printer, or other type of printer that ejects liquid droplets.

The simulator 102 may have settings that are adjustable by the user and represent actual settings of the actual 3D printer 104. Each of the printer settings also relates in some way to one or more parameters of the trained neural network 108. For example, droplet parameters, printing frequency, etc. may determine the choice of training data, which will in turn affect the network's hyperparameters and the learned weights and biases. Accordingly, the user can adjust the printer settings virtually and the effect of the printer settings in the real world can be simulated by affecting corresponding changes to the trained neural network 108. In this way, different printer settings can result in a different digital twin. The digital twin generated by the simulator 102 may be represented by one or more 3D visualizations that can be presented to the user in a graphical user interface to convey information about shape, temperature, among others.

The digital twin is generated by the simulator 102 using the trained neural network 108 and the object model 106 as input. The simulator 102 is intended to simulate the actual physical product that would be produced by the actual 3D printer 104 if the same object model 106 and printer settings were supplied as input to the actual 3D printing process. In this way, any flaws or undesirable characteristics can be identified in the digital twin without the need to run an actual print job. Additionally, the printer settings can be adjusted by the user to determine the most suitable printer settings for a particular print job. Once the user is satisfied with the quality of the digital twin, the printer settings can be transferred to the actual 3D printer 104 and used for printing the actual 3D object.

The degree of agreement between the digital twin and the actual printed object will depend, at least in part, on the accuracy of the trained neural network 108. The trained neural network 108 may be generated using a neural network processing device 114, which also has access to the data storage device 110 through the network 112. The training process may be performed using design input 116, which may include training data 118 and test data 120.

The training data and the test data both include pairs of input data, denoted 'a', and output data, denoted 'u'. The input data is data that is to be fed to the neural network and the corresponding output data of the same a-u pair represents the desired output of the neural network for that input. In some embodiments, the input data describes an initial state of a substrate and a molten droplet inside a moving subdomain prior to the molten droplet impacting the substrate, and the output data describes a final state of the substrate inside that moving subdomain after the molten droplet has impacted the substrate and coalesced with previously deposited droplets making up the initial state of the substrate. If the neural network is an FNO, the input data also includes the local spatial discretization of the moving subdomain. The training data can include any suitable number of input training samples and corresponding output training samples, and the test data can include a suitable number of input test samples and corresponding output test samples.

The training data and the test data may be obtained through experiment. For example, experimental data may be obtained by performing measurements in relation to an actual print job run by the 3D printer or a similar 3D printer. The experimental data may be obtained, for example, through video camera imaging of a droplet. The training data and the test data may also be obtained through simulation using, for example, an HF multi-physics model. The input data and output data are described further in relation to FIG. 2.

The design input 116 may also include a surrogate model architecture, e.g., neural network architecture 130, which may be specified by the user. The surrogate model architecture dictates the type of surrogate model and can also describe the adjustable features of the model, e.g., the model's hyperparameters, a suitable range of values for each of the hyperparameters, and an amount by which the hyperparameters can be adjusted.

To generate the trained neural network 108, the processing device 114 may first select values for the hyperparameters of the neural network at block 122. The hyperparameters may be any parameters that affect the structure of the neural network, such as the number of hidden layers and the number of neurons in each hidden layer, or determine how the neural network is trained, such as the learning rate and batch size, among others. If the neural network is an FNO, selecting values for the hyperparameters may include selecting the number of retained Fourier modes and the number of channels for each Fourier layer.

At block 124, the neural network is trained using the selected hyperparameter values and the training data 118. Training the neural network means computing the values of the weights and biases that minimize a cost function. The neural network is fed input training samples, and the cost function consists of terms that can be calculated based on a comparison of the neural network's output and the corresponding output training samples, or are related to satisfying the initial and/or boundary conditions of the partial differential equations (PDEs) governing the physical processes related to the droplet coalescence or other aspects of the printing process, or minimizing the residual for one or more of these PDEs, among other terms.

The neural network 108 can be trained in a feedforward manner and using any suitable training algorithm, including a gradient descent algorithm such as the adaptive movement estimation (Adam) algorithm, possibly in conjunction with a mini-batch technique. Implementation can be done via the machine learning framework PyTorch or TensorFlow 2.0, among others.

When the neural network is finished training, the trained neural network can be tested at block 126 by feeding a number of input test samples from the test data 120, and comparing the neural network's outputs with the corresponding output test samples. An error value may be computed for each test sample. At block 128, the distribution of test sample errors or any derived properties like its mode or mean may be computed.

If the test error metric exceeds a specified threshold, the training process may return to block 122, wherein a new set of hyperparameter values is selected and/or the training data selection is updated. The adjusted neural network can then be trained at block 124, tested at block 126, and an appropriate test error metric for the trained neural network can be computed. The process may be repeated until the resulting test error metric is below the threshold, or the process may be repeated a specified number of times to provide an adequate sampling of the hyperparameter space, with the trained neural network producing the smallest test error metric selected as the final trained neural network. The final trained neural network may be stored and used by the simulator as trained neural network 108. Additional details of the training process are described in relation to FIGS. 2-4.

In some embodiments, the trained neural network 108 may be applicable to a specific type of printer, for example, a specific brand and/or specific 3D printer version. In such cases, the trained neural network 108 may be broadly applicable to a type of 3D printer or a combination of a specific type of 3D printer and a specific type of build material. In such cases, the training data 118 and test data 120 may be obtained by experimentation or simulation and the training process performed by the manufacturer or other third party such as the developer of the simulator software. The trained neural network 108 can then be provided to users or used by the simulator 102 in cases in which simulator itself is provided as a service.

It will be appreciated that various alterations may be made to the system 100 and that some components may be omitted or added without departing from the scope of the disclosure.

Figure 2:
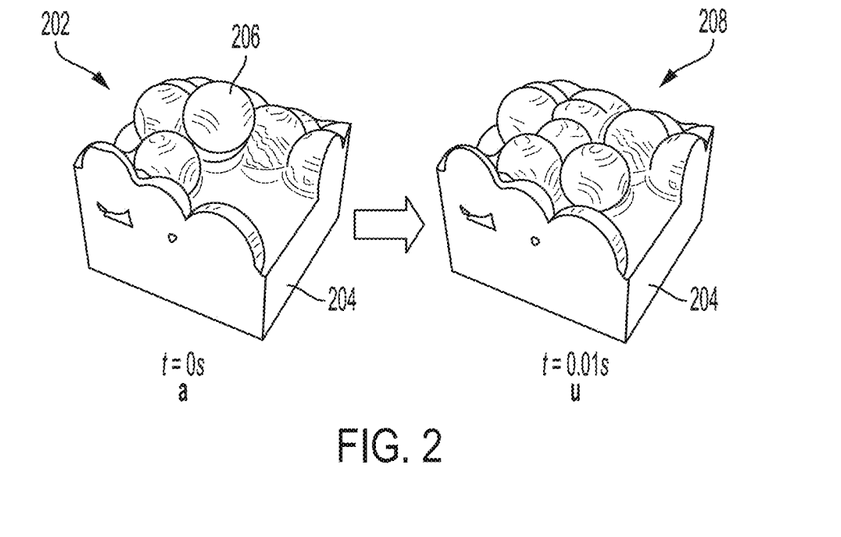
FIG. 2 illustrates an example of an input-output data pair, a collection of which are used to train and test a surrogate model such as a neural network, in accordance with certain aspects of the present disclosure.

FIG. 2 illustrates an example of the data used to train and test the neural network of FIG. 1, in accordance with certain aspects of the present disclosure. Both the left (a) and right (u) elements of the data pair are contained in a moving subdomain. The data shown in FIG. 2 are voxel representations of a portion of a simulated 3D printed part, where each voxel represents some value that characterizes the part at a particular point. For example, a voxel value may be a scalar referring to the local mass fraction of a single phase (e.g., liquid, gas or solid) or a combination of some of them, the local temperature, or the local pressure, among other physical properties, or may be a three-dimensional vector referring to the local material velocity.

The image 202 on the left represents the pre-coalescence state of the substrate 204 and a molten droplet 206 at an initial state (here denoted by t=0 seconds). As shown in FIG. 2, the molten droplet 206 is positioned at a particular location above the substrate, i.e., not touching the substrate. The size and position of the molten droplet 206 and its voxel values may be selected to represent the deposition of a single droplet of molten metal onto a 3D object being printed.

The image 208 on the right represents the final (post-coalescence) state of the substrate 204 after the molten droplet has impacted the substrate and coalesced with the existing (fully or partially) solidified droplets (in the provided example, at t=0.01 seconds). The post-coalescence substrate characteristics that can be computed using the neural network 108 may include local shape, temperature history, velocity, and pressure. As can be seen in the image 208, the previously molten droplet has merged with the substrate and (at least partially) solidified. The data represented by the image 208 represents the output, u, of the neural network.

The form of the data represented in images 202 and 208 may be the same whether the data is training data, test data, or input-output data pairs produced during an actual predictive simulation performed by the trained neural network. In other words, image 202 may represent an input training sample, an input testing sample, or an input provided for a predictive simulation, and image 208 may represent an output training sample, an output testing sample, or an output generated by the neural network for a predictive simulation.

Figure 3:
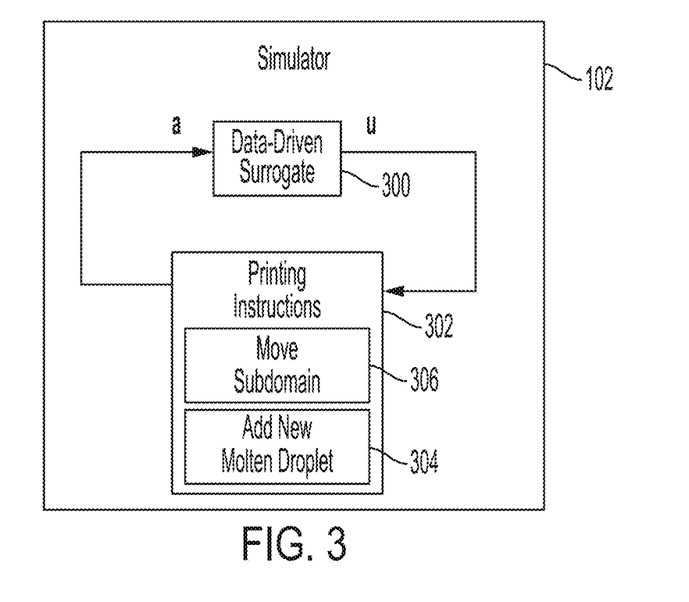
FIG. 3 is a block diagram illustrating a simulation process performed by a 3D printer simulator, in accordance with certain aspects of the present disclosure.

FIG. 3 is a block diagram illustrating a simulation process performed by a simulator that simulates a 3D printing process, in accordance with certain aspects of the present disclosure. The 3D printer simulator may be the simulator 102 and the data-driven surrogate 300 may be the trained neural network 108, both shown in FIG. 1. The simulator 102 simulates a 3D print job by simulating the deposition of individual droplets. For each droplet, the initial state representing the molten droplet suspended over the substrate inside a moving subdomain is fed to the neural network as its input, a, (which may be concatenated with other features such as, e.g., the local spatial grid within the moving subdomain, depending on the neural network architecture). The neural network receives the input, a, and generates an output, u, representing the final state of the substrate inside the moving subdomain after the droplet has coalesced with previously deposited droplets.

Next, the output, u, is processed according to the printing instructions 302. For example, the 3D object model may be converted into printing instructions that can direct the machinery of 3D printer, such as G-code. At block 304, the printing instructions can be interpreted to determine the spatial coordinates of the new liquid droplet and add the new liquid droplet to the substrate, which is suspended above the existing substrate according to the spatial coordinates dictated by the 3D object model. Based on the coordinates of the new liquid droplet, a new subdomain of interest is determined at block 306 which contains both the new liquid droplet and a portion of the existing substrate containing (possibly partially) solidified droplets from previous depositions. This (along with the local spatial discretization within the new subdomain, for FNO) will constitute the new initial state, a, for the droplet deposition. The described process may be repeated until all of the droplet depositions for the 3D object, or a portion thereof, have been simulated.

The data-driven surrogate 300 can be any suitable type of neural network, including neural operators/operator networks (also known as OL) and their physics-informed variants that combine OL with concepts from physics-informed neural networks (PINNs), among others. An example of a Fourier Neural Operator (FNO) is described further below.

HF multi-physics models can also be used to predict of the shape and material properties of a part printed through LMJ. This involves numerical time integration of a coupled set of partial differential equations (PDEs) describing conservation of mass and momentum, balance of mass fraction, and heat transfer. This can done using multi-physics solvers such as COMSOL® or OpenFOAM. However, depending on the mesh resolution, a droplet can take anywhere from 10 minutes to 48 hours to simulate via such physics-based solvers, while printing a typical part can require millions of droplets ejected at 400-1000 Hz from the nozzle. Hence, such physics-based solvers are too computationally intensive to allow real-time prediction of as-manufactured shapes during the printing process.

In accordance with embodiments of the present disclosure, the multi-physics model is replaced by a data-driven surrogate model 300, such as the neural network 108, which is trained to determine the final state, u, from the initial state, a, for each individual droplet deposition. The neural network 108 may be trained using either high-fidelity data obtained with the physics-based solver or measurement data from LMJ AM experiments. Additionally, some neural network approaches (e.g., physics-informed neural networks and physics-informed variants of OL approaches) require knowledge of only the initial and boundary conditions of the problem, along with (possibly) a few input-output training data pairs. Accordingly, the amount of training data needed to train the neural network 108 can be reduced, which reduces the number of numerical time integrations of the problem via the physics-based solver to obtain the training data set.

One embodiment of the neural network architecture that can be used to approximate the mapping from a to u in the moving subdomain for a simulator such as the simulator 102 of FIG. 3, in accordance with certain aspects of the present disclosure, is the Fourier neural operator (FNO), which may be used as the neural network 108 shown in FIGS. 1 and 3. Operator learning models enable using the same trained operator across numerous instances of the problem with the same partial differential equations and boundary conditions, but different initial conditions. This avoids having to retrain the neural network for each new droplet deposition, which will be characterized by new initial conditions (e.g. substrate's shape, temperature, and other parameters), but whose physical process is described by the same set of PDEs and boundary conditions. In some embodiments, physical constraints may be incorporated into the loss function of the neural operator, potentially reducing the required amount of training data to achieve similar accuracy on the test data set.

Figure 4:
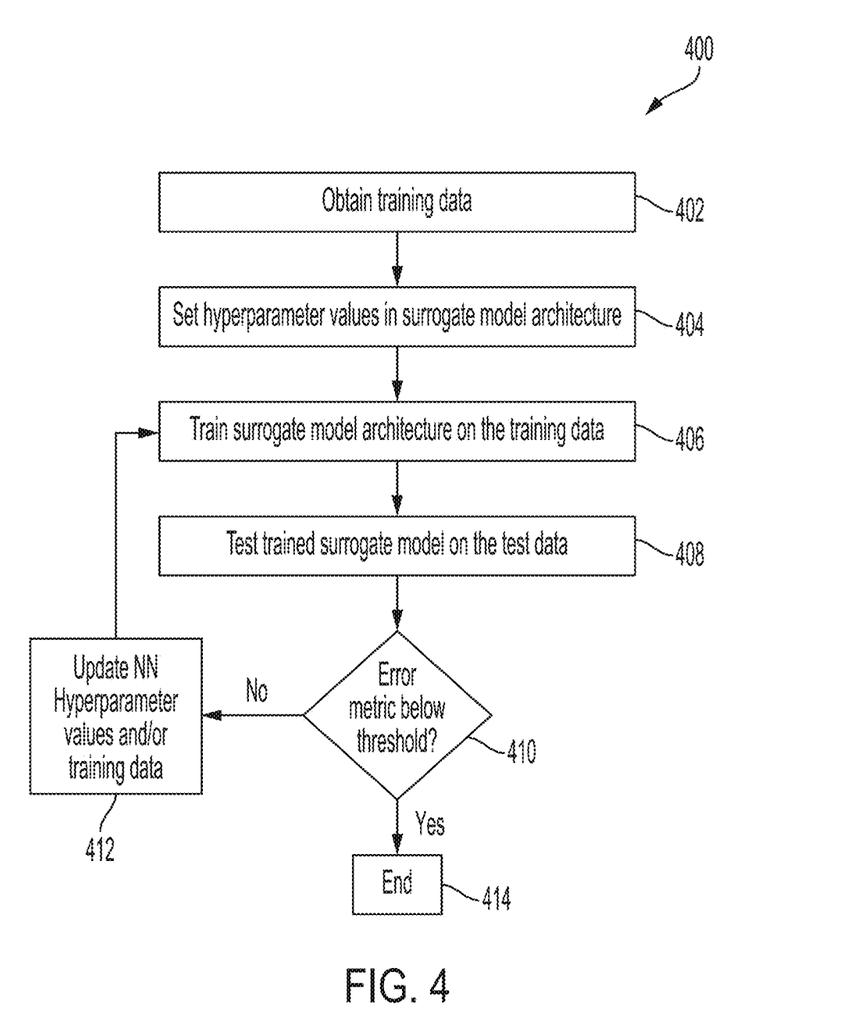
FIG. 4 illustrates a process flow diagram of a method for building a trained data-driven surrogate model, in accordance with certain aspects of the present disclosure.

FIG. 4 illustrates a process flow diagram of a method of modeling a droplet-based additive manufacturing process, in accordance with certain aspects of the present disclosure. The method may be performed by a computing device such as the neural network processing device 114 shown in FIG. 1. The method may begin at block 402.

At block 402, training data is obtained. The training data may include pairs of input, a, and output u, wherein the input, a, comprises an initial state of a substrate and a molten droplet inside a moving subdomain prior to the molten droplet impacting the substrate and the output u comprises a final state of the substrate inside that moving subdomain after the molten droplet has coalesced with the already (partially or fully) solidified droplets making up the substrate in its initial state. The training data may be experimentally measured data or may be simulated using a high-fidelity multi-physics solver, for example. In some examples, the input data and the output data both include a three-dimensional array of voxels, wherein each voxel includes one or more scalar values that describe a local property of the printed part such as phase fraction, temperature, pressure or velocity.

At block 404, one or more hyperparameter values in a surrogate model architecture are set. The hyperparameter values may be selected from a range of values specified by the user. The hyperparameters may include the number of hidden layers, the number of neurons in each hidden layer, learning rate, and batch size, among others. For instance, if the neural network is a Fourier neural operator, the hyperparameters may include the number of retained Fourier modes and the number of channels for each Fourier layer.

At block 406, the surrogate model architecture is trained on the training data to generate a trained surrogate model. This trained surrogate model can be used in lieu of a physics-based model to make predictions about the results of an additive manufacturing process. In some embodiments, the training process is performed, at least in part, using a graphics processing unit (GPU).

At block 408, the trained surrogate model is tested using a set of test data to compute a test error metric, which may be an average error over the test samples. If, at block 410, the test error metric exceeds a threshold, the process flow advances to block 412 and the hyperparameter values and/or the training data selection can be updated. The process flow then returns to block 406, and the surrogate model can be retrained using the (possibly updated) training data and/or the new hyperparameter values. If, at block 410, the test error metric is below the threshold, the process flow advances to block 414 and the process ends, resulting in a final trained surrogate model. Once the final trained surrogate model is obtained, it can be stored and/or distributed for use in making predictions.

Various operations are described as multiple discrete operations, in turn, in a manner that is most helpful in understanding the present disclosure, however, the order of description may not be construed to imply that these operations are necessarily order dependent. In particular, these operations need not be performed in the order of presentation.

Figure 5A:
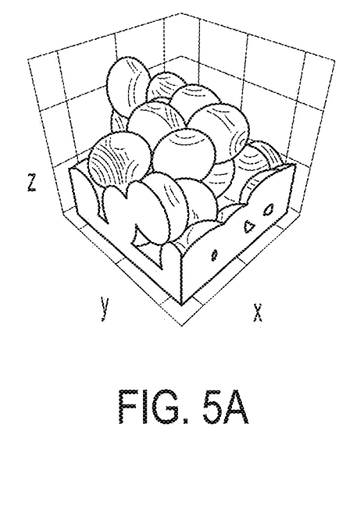
FIG. 5A is an illustration of simulation results of a portion of a 3D printed part shape, contained within a moving subdomain, obtained using a high-fidelity physics-based model, in accordance with certain aspects of the present disclosure.

FIG. 5A is an illustration of the simulated output for a portion of a 3D printed object obtained using a high-fidelity physics-based model, in accordance with certain aspects of the present disclosure. To appreciate the scale, the cubic volume shown in FIG. 5A is about one millimeter on each side. The simulation results were generated on a 96-core Central Processing Unit (CPU). To simulate 0.01 seconds of deposition time, which is the amount of time to deposit a single droplet of molten material on an actual 3D printer printing at a frequency of 100 Hz, the total run time of the simulation was approximately 10 minutes.

Figure 5B:
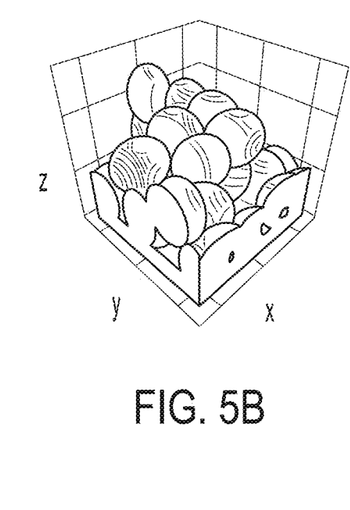
FIG. 5B is an illustration of simulation results of a portion of a 3D part shape, contained within a moving subdomain, obtained using a data-driven surrogate model based on operator learning, in accordance with certain aspects of the present disclosure.

FIG. 5B is an illustration of the simulated output for a portion of a 3D printed object obtained using a surrogate model, specifically a Fourier neural operator, in accordance with certain aspects of the present disclosure. The Fourier Neural Operator was trained using 729 training samples (input and output) for a cube shaped part, and tested using 500 samples (input and output) for a cone shaped part. The average droplet-level test error for this simulation was approximately 11 percent.

The simulation results of FIG. 5B were generated on a graphics processing unit (GPU). Predicting the final state after 0.01 seconds of deposition time took approximately 0.005 seconds. Accordingly, the Fourier Neural Operator technique was able to provide simulation results orders of magnitude faster than the physics-based solver, and well under the 0.01 second threshold to enable real-time prediction (ignoring computational overhead from other parts of the simulation).

Figure 6:
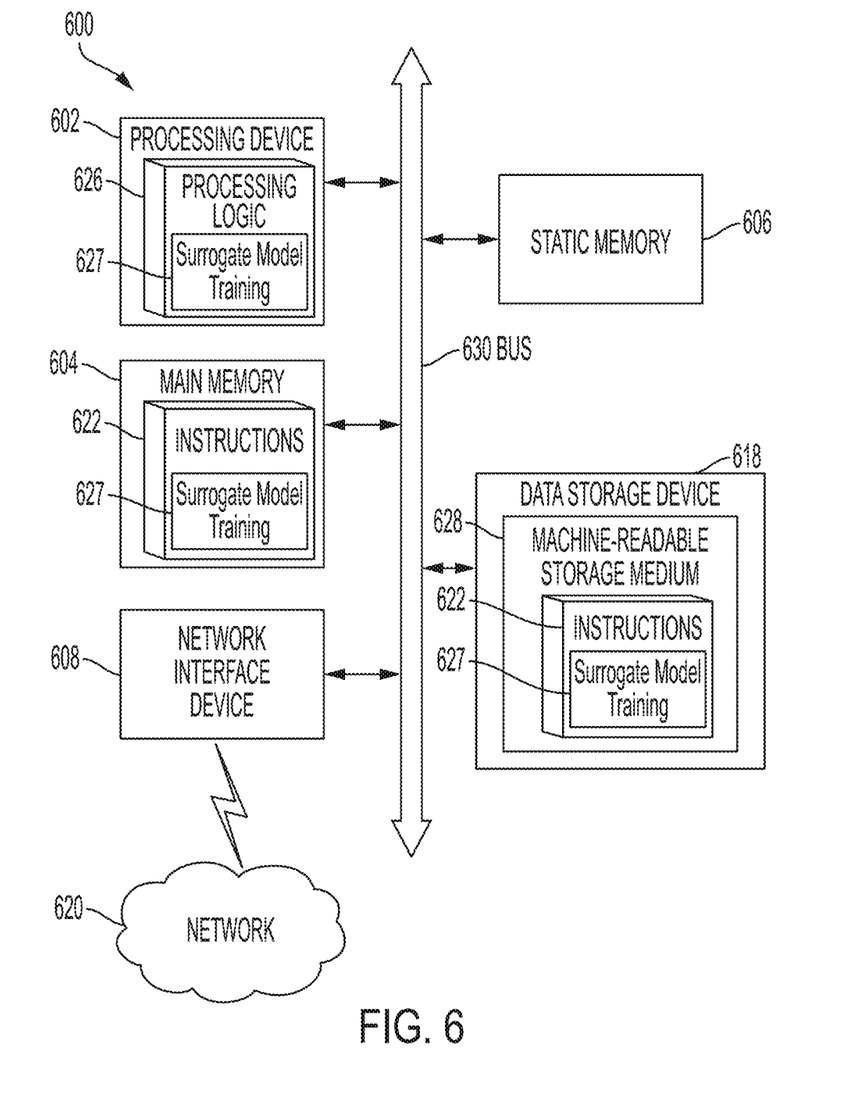
FIG. 6 illustrates an example computational device for performing operations of a surrogate model training algorithm and of an algorithm to make predictions using the trained surrogate model, in accordance with certain aspects of the present disclosure.

FIG. 6 illustrates a diagrammatic representation of a machine in the example form of a computer system 600 which includes a set of instructions 622 and/or processing logic 626 for causing the machine to perform any one or more of the methodologies discussed herein. For example, the set of instructions 622 and processing logic 626 may include a surrogate model training algorithm 627 for generating a surrogate model in accordance with the techniques described herein. In various embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a web appliance, a server, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server computer system, such as system 100.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus

630. The processing device 602 may be implemented as the model calibration processing device 114 of FIG. 1 or a related processing device unit, a system processing device (e.g., including the computational layer 150), or both. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, graphics processing unit (GPU), or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 may execute processing logic 626, which may be one example of system 100 shown in FIG. 1, for performing the operations and steps discussed herein.

The data storage device 618 may include a machine-readable storage medium 628, on which is stored one or more set of instructions 622 (e.g., software) embodying any one or more of the methodologies of functions described herein. The instructions 622 may also reside, completely or at least partially, within the main memory 604 or within the processing device 602 during execution thereof by the computer system 600; the main memory 604 and the processing device 602 also constituting machine-readable storage media. The instructions 622 may further be transmitted or received over a network 620 via the network interface device 608.

The non-transitory machine-readable storage medium 628 may also be used to store instructions to perform the methods and operations described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A method of modeling a molten droplet-based additive manufacturing process, comprising:
   obtaining training data;
   setting one or more hyperparameter values in a surrogate model architecture;
   training, by a processing device, the surrogate model architecture on the training data to generate a trained surrogate model, wherein the trained surrogate model is to be used in lieu of a physics-based model to make predictions for predicting a state of a molten droplet deposition process,
   wherein the training data comprises pairs of input data and output data, wherein the input data describes an initial state of a substrate and a molten droplet inside a moving subdomain prior to the molten droplet impacting the substrate and the output data describes a final state of the substrate inside that moving subdomain after the molten droplet has impacted the substrate and coalesced with previously solidified droplets and solidified when cooled, the previously solidified droplets making up the initial state of the substrate; and
   using the trained surrogate model to predict post-coalescence substrate characteristics from pre-coalescence substrate characteristics, as part of generating a digital twin of a 3D printed part to be created by an actual 3D printer, wherein the post-coalescence substrate characteristics include local shape, temperature history, velocity, and pressure.

2. The method of claim 1, wherein the training data is simulated using a physics-based solver.

3. The method of claim 1, wherein the surrogate model architecture comprises at least one of machine learning, deep learning, operator learning, or a combination thereof.

4. The method of claim 1, wherein the input data and output data comprise a three-dimensional array of voxels, wherein each voxel contains a local property of a printed part such as a local phase fraction for a single phase or a combination of phases, a local temperature, pressure, material velocity, among other possible quantities.

5. The method of claim 1, wherein the processing device is a graphics processing unit (GPU).

6. The method of claim 1, wherein one or more settings of the 3D printer are adjusted based on the predictions so as to improve the quality of a 3D printed part to be created by the actual 3D printer.

7. An apparatus for modeling a molten droplet-based additive manufacturing process, the apparatus comprising:
   a memory to store training data; and
   a processing device operatively coupled to the memory, wherein the processing device is to:
      set one or more hyperparameter values in a surrogate model architecture;
      train the surrogate model architecture on the training data to generate a trained surrogate model, wherein the trained surrogate model is to be used in lieu of a physics-based model to make predictions for predicting a state of a molten droplet deposition process,
      wherein the training data comprises pairs of input data and output data, wherein the input data describes an initial state of a substrate and a molten droplet inside a moving subdomain prior to the molten droplet impacting the substrate and the output data describes a final state of the substrate and the molten droplet inside that moving subdomain after the molten droplet has impacted the substrate and coalesced with previously solidified droplets and solidified when cooled, the previously solidified droplets making up the initial state of the substrate; and
      train and test the surrogate model, make predictions using the trained surrogate model, and predict post-coalescence substrate characteristics from pre-coalescence substrate characteristics, as part of generating a digital twin of a 3D printed part to be created by a 3D printer, wherein the post-coalescence substrate characteristics include local shape, temperature history, velocity, and pressure.

8. The apparatus of claim 7, wherein the training data is simulated using a physics-based solver.

9. The apparatus of claim 7, wherein the surrogate model architecture comprises at least one of machine learning, deep learning, operator learning, or a combination thereof.

10. The apparatus of claim 7, wherein the input data and output data comprise a three-dimensional array of voxels, wherein each voxel contains a local property of a printed part such as a local phase fraction for a single phase or a combination of phases, a local temperature, pressure, material velocity, among other possible quantities.

11. The apparatus of claim 7, wherein the processing device is a graphics processing unit (GPU).

12. The apparatus of claim 7, wherein one or more settings of the 3D printer are adjusted based on the predictions so as to improve a quality of the 3D printed part to be created by the actual 3D printer.

13. A non-transitory computer-readable storage medium having instructions stored thereon that, when executed by a processing device, cause the processing device to:
   obtain training data;
   set one or more hyperparameter values in a surrogate model architecture;
   train, by the processing device, the surrogate model architecture on the training data to generate a trained surrogate model, wherein the trained surrogate model is to be used in lieu of a physics-based model to make predictions for predicting a state of molten droplet deposition process,
   wherein the training data comprises pairs of input data and output data, wherein the input data describes an initial state of a substrate and a molten droplet inside a moving subdomain prior to the molten droplet impacting the substrate and the output data describes a final state of the substrate and the molten droplet inside that moving subdomain after the molten droplet has impacted the substrate and coalesced with previously solidified droplets and solidified when cooled, the previously solidified droplets making up the initial state of the substrate; and
   use the trained surrogate model to predict post-coalescence substrate characteristics from pre-coalescence substrate characteristics, as part of generating a digital twin of a 3D printed part to be created by an actual 3D printer, wherein the post-coalescence substrate characteristics include local shape, temperature history, velocity, and pressure.

14. The non-transitory computer-readable storage medium of claim 13, wherein the surrogate model architecture comprises at least one of machine learning, deep learning, operator learning, or a combination thereof.

15. The non-transitory computer-readable storage medium of claim 13, wherein the processing device is a graphics processing unit (GPU).

16. The non-transitory computer-readable storage medium of claim 13, wherein the instructions further cause the processing device to use the trained surrogate model to predict post-coalescence substrate characteristics from pre-coalescence substrate characteristics, as part of generating a digital twin of a 3D printed part to be created by an actual 3D printer.

\* \* \* \* \*